United States Patent

Bezos et al.

[11] Patent Number: 5,881,768
[45] Date of Patent: Mar. 16, 1999

[54] COMBINATION MOTOR/PNEUMATIC DRIVEN TRAIN BRAKE PIPE PRESSURE EXHAUST VALVE

[75] Inventors: Angel P. Bezos, Rockwood, Md.; James E. Hart, Trafford, Pa.

[73] Assignee: Westinghouse Air Brake Company, Wilmerding, Pa.

[21] Appl. No.: 831,485

[22] Filed: Mar. 31, 1997

[51] Int. Cl.[6] .................................................. F16K 31/00
[52] U.S. Cl. .......................... 137/606; 137/602; 137/628; 251/14; 303/22.4
[58] Field of Search ............................... 137/625, 625.12, 137/625.17, 602, 605, 606, 628, 625.4; 251/14; 303/22.4

[56] References Cited

U.S. PATENT DOCUMENTS

| | | | |
|---|---|---|---|
| 4,284,098 | 8/1981 | Kruschik | 251/14 X |
| 4,615,353 | 10/1986 | McKee | 251/61.2 X |
| 5,586,813 | 12/1996 | McKay et al. | 303/22.4 |

*Primary Examiner*—Kevin Lee
*Attorney, Agent, or Firm*—James Ray & Associates

[57] ABSTRACT

A valve device is used to reduce the air pressure in a brake pipe disposed on a railroad car in a train consist at a location in the train consist remote from the locomotive of the train consist. The valve device defines a primary supply passage, a branch supply passage and an exhaust passage. The primary and branch passages communicate with the brake pipe. All of the passages communicate with an elongated bore defined within the valve device. The valve device includes an adjustable first valve, a second valve, an electric motor drive and a pneumatic drive. The adjustable first valve and the second valve are both part of an elongated valve body member that can move reciprocatingly within the elongated bore. The adjustable first valve is used to vent air pressure from the brake pipe via the primary and exhaust passages at various rates of discharge. The rate of discharge is in proportion to the extent the adjustable first valve is commanded open. The electric motor drive responds to a drive signal for a service brake pipe air pressure reduction through which it opens the adjustable first valve, but not the second valve. The second valve is used to quickly vent air pressure from the brake pipe via the branch and exhaust passages. The pneumatic drive responds to an actuating signal for an emergency brake pipe air pressure reduction through which it fully opens the second valve thereby also fully opening the adjustable first valve.

20 Claims, 2 Drawing Sheets

COMBINATION MOTOR/PNEUMATIC DRIVEN TRAIN BRAKE PIPE PRESSURE EXHAUST VALVE

FIELD OF THE INVENTION

The present invention generally relates to a valve for exhausting pressure in the brake pipe of a railroad train consist at a location remote from the locomotive concurrently with a brake valve regulating service reduction of brake pipe pressure at the locomotive. More particularly, the invention pertains to a valve device that is motor driven for a service brake application and pneumatically driven for an emergency brake application.

CROSS REFERENCE TO RELATED APPLICATIONS

The invention taught in this patent application is closely related to the inventions taught in two co-pending patent applications, namely: A TRAIN BRAKE PIPE PRESSURE EXHAUST CONTROL SYSTEM AND REGULATING VALVE THEREFOR, Ser. No. 08/562,961, filed Nov. 27, 1995; and PNEUMATICALLY DRIVEN TRAIN BRAKE PIPE PRESSURE EXHAUST VALVE, filed concurrently herewith and having Ser. No. 08/815,422. These patent applications are assigned to the assignee of the present invention and the teachings therein are incorporated into the present application by reference.

BACKGROUND OF THE INVENTION

There is currently an ongoing effort in the railway industry to develop electro-pneumatic brakes for railroad freight trains. It is generally acknowledged that such an electro-pneumatic brake control will enhance train operation by achieving a faster brake response, more equalized car retardation and a generally more uniform braking effort throughout a long train of cars.

These improved results are based on the assumption that all of the cars, or at least a majority of the cars, making up a train consist will be appropriately equipped for such electro-pneumatic braking, in which case direct braking cylinder pressure control is envisioned. With the exception of certain unit trains, however, it cannot currently be reasonably expected that any such majority of cars will be immediately implemented with the required electro-pneumatic equipment.

Accordingly, for the present, indirect brake cylinder pressure control is still extensively utilized. In this arrangement, the train brake pipe pressure is controlled at the locomotive and also at one or several remote cars throughout the train consist to accelerate reductions of brake pipe pressure in order to obtain a faster and more uniform brake response.

Presently, railroad trains are required to carry an end-of-train unit on the last car, which, among other functions, may be equipped to independently and remotely initiate a reduction of brake pipe pressure from the rear of the train in response to the operator activation of a special triggering device disposed in the locomotive. This is accomplished by transmitting an emergency brake application command signal from the locomotive to the end-of-train unit via radio communication.

SUMMARY OF THE INVENTION

One approach to effecting such a brake pipe pressure reduction is to utilize a control valve having a variable orifice in which the brake pipe pressure is discharged through an orifice, the size of which is adjustable in proportion to the pressure reduction requirement. The present invention, conversely, is predicated upon the use of a valve device which is motor driven for purposes of a service brake application and pneumatically driven for purposes of an emergency brake application.

In essence, the present invention is intended to be incorporated into a more or less conventional radio control system for exhausting the train brake pipe pressure at the last car in accordance with service, as well as, emergency brake application signals transmitted from the locomotive. In its broadest sense, the present invention comprises a valve device for reducing the brake pipe pressure in the last car, or any selected car, of the train consist. The valve device has an adjustable valve means adapted to discharge or vent brake pipe pressure from such brake pipe when the valve means is at least partially open. The rate of discharge is in proportion to the extent the valve means is open. The valve device includes a motor drive means and a pneumatic drive means. The motor drive means is responsive to a signal for a service brake pipe pressure reduction to at least partially open the valve means. The pneumatic drive means is responsive to a signal for an emergency brake pipe pressure reduction to fully open the valve means.

In a more specific aspect of the invention, the valve device comprises a valve body having at least one supply passage to which the brake pipe is connected, an exhaust passage open to atmosphere, and a bore with which the supply passage and the exhaust passage are in communication. A valve means is disposed within the bore. The valve means reciprocates between a closed position and a fully open position to selectively close, open and partially open the supply passage or passages to the exhaust passage. An electric motor drive means is provided to partially and controllably open the valve means to thereby partially open the supply passage to the exhaust passage, thereby venting brake pipe pressure pursuant to the signal for a service brake pipe pressure reduction. A pneumatic drive means is provided to quickly and fully open the valve means to fully exhaust the brake pipe pressure pursuant to the signal for an emergency brake pipe pressure reduction.

In an even more specific aspect of this invention, the valve device comprises a valve means having two supply passages to which the brake pipe is connected. Both of these passages are in communication with the bore on either side of the exhaust passage. A reciprocatible valve body includes two valves. The first valve is adjustable and lies between a first of the supply passages and the exhaust passage. The second valve lies between the second supply passage and the exhaust passage. The motor drive means is adapted for micro adjustment of the reciprocatible valve body sufficient to selectively open the first adjustable valve to thereby controllably open the first supply passage to the exhaust passage for service brake pipe pressure reductions, but not be sufficient to open the second valve intended for emergency brake pipe pressure reductions. The pneumatic drive means is adapted for macro movement of the reciprocatible valve body to fully open the second valve thereby fully open the second supply passage to the exhaust passage for emergency brake pipe pressure reductions.

OBJECTIVES OF THE INVENTION

It is, therefore, one of the primary objectives of the present invention to incorporate in the end-of-train unit an electrically controlled pneumatic valve device for exhausting the train brake pipe pressure at a location in a train consist remote from the locomotive in accordance with service, as well as, emergency brake application signals transmitted from the locomotive.

Another objective of the present invention is to provide a valve device for reducing the brake pipe pressure at a location in a train consist remote from the locomotive which has a relatively high degree of reliability and ruggedness.

A further objective of the present invention is to provide a valve device for reducing the brake pipe pressure at a location in a train consist remote from the locomotive which utilizes an electric motor for a micro-controlled operation of regulating the valve device for a service brake pipe pressure reduction and a pneumatic system for a macro-controlled operation of the valve device for an emergency brake pipe pressure reduction.

Still another objective of the present invention is to provide a valve device for reducing the brake pipe pressure at a location in a train consist remote from the locomotive as in the foregoing, that is suitably sized for installation in the end-of-train unit disposed on the last car of such train consist.

Still a further objective of the present invention is to provide a valve device for reducing the brake pipe pressure at a location in a train consist remote from the locomotive, as in the foregoing, which will not cause the railcar brakes to release in the event of a power failure.

In addition to the objectives and advantages described above, various other objectives and advantages of the invention will become more readily apparent to those persons who are skilled in the railway braking art from the following more detailed description of the invention, particularly, when such description is taken in conjunction with the attached drawings and with the appended claims.

DESCRIPTION OF A PREFERRED EMBODIMENT OF THE INVENTION

Figure 1:
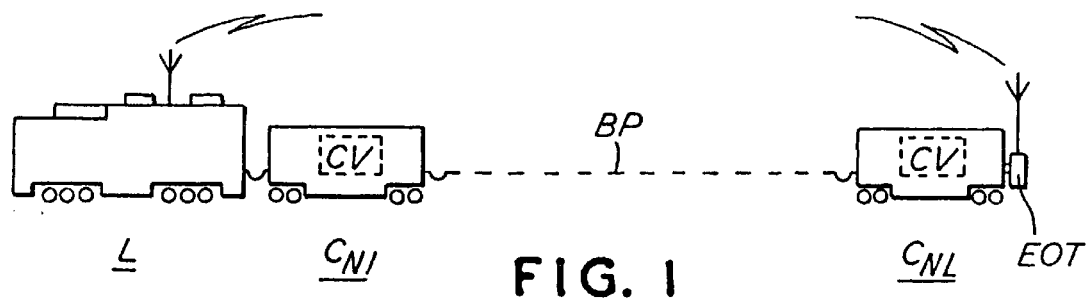
FIG. 1 is a schematic illustration of a railroad train comprising a plurality of freight cars headed by a locomotive capable of radio communication with an end-of-train unit on the last car of the train.

As illustrated in FIG. 1, railroad cars $C_N$ of a train are physically coupled to a locomotive L by typical car couplers (not shown) and are further coupled pneumatically by a brake pipe BP that extends continuously from the locomotive L to the last car $C_{NL}$. Associated with the last car in the train consist is an end-of-train unit EOT that is coupled to the locomotive L via radio communication.

The last car $C_{NL}$ of the train consist is further provided with a brake control valve device CV, as are all of the other cars $C_N$. Brake control valve devices CV are preferably an A.A.R. standard AB type control valve, such as an ABD, ABDW or ABDX valve manufactured by Westinghouse Air Brake Co. As is well known in the railroad art, these car control valve devices CV operate to control the car brakes in response to variations of the train brake pipe pressure at the respective cars.

Figure 2:
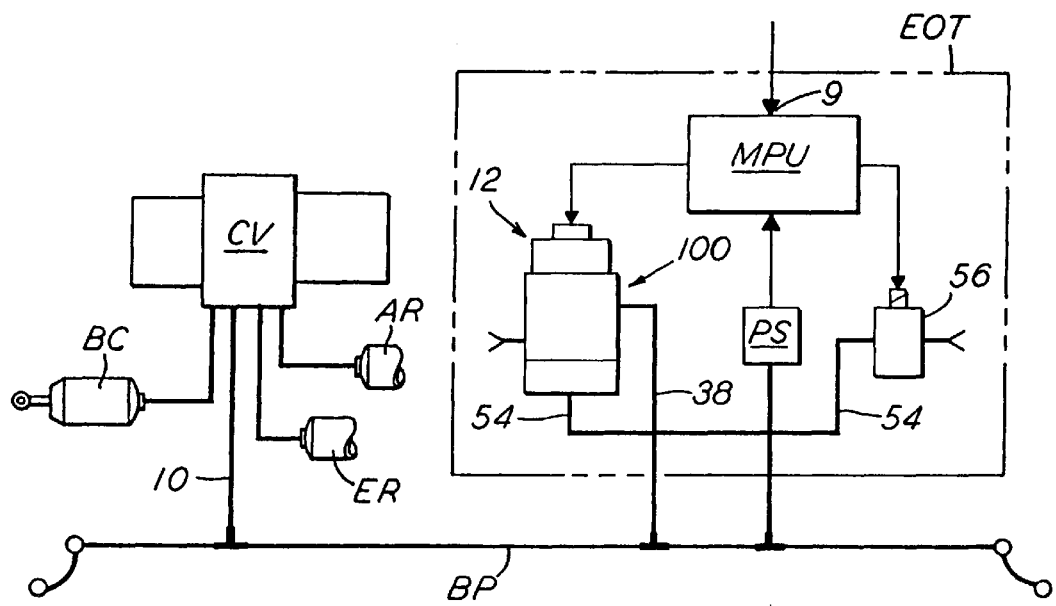
FIG. 2 is a block diagram of a microprocessor based indirect brake cylinder pressure control system adapted for end-of-train service as can be utilized in conjunction with the motor-pneumatic controlled valve device of this invention.

Referring now to FIG. 2, the end-of-train unit EOT includes a microprocessor unit MPU. The microprocessor unit MPU is provided with a feedback signal from pressure sensor PS indicative of brake pipe pressure and, also, a brake command signal 9 via radio transmission from the locomotive that operates the brake pipe pressure valve device 100 which is the subject of this invention. Generally stated, the brake command signal 9 takes the form of either a service brake command signal or an emergency brake command signal.

The microprocessor unit MPU is programmed to compare the existing brake pipe pressure as represented by the signal from the pressure transducer PS to a given target pressure. This given target pressure is supplied to the microprocessor unit MPU as the brake command signal 9 transmitted via radio transmission from the locomotive. Through this signal, the locomotive may command either a full reduction in brake pipe pressure to make an emergency application of the brakes or something less than a full reduction in brake pipe pressure so as to make a service application of the brakes. The extent of the service brake application can, of course, be conveyed in the brake command signal.

Pursuant to such operation, the microprocessor unit MPU will, in response to the service brake command signal, activate a motor drive means 12 to the extent necessary to achieve a requisite brake pipe pressure reduction via valve 20. Additionally, such microprocessor unit MPU will, in response to the emergency brake command signal, open a solenoid operated valve 56 and thereby fully exhaust the brake pipe pressure via emergency valve 22.

Each car $C_N$, including the last car $C_{NL}$, has its control valve CV connected to brake pipe BP via a branch pipe 10. The control valve CV on each car is associated with an auxiliary reservoir AR and an emergency reservoir ER that are charged via brake pipe BP and provide a source of compressed air for operating the car brake cylinder device BC in response to service and emergency rates of reduction in the brake pipe pressure.

The control valve device CV operates in response to increasing brake pipe pressure to charge both the auxiliary reservoir AR and the emergency reservoir ER to the operating pressure of such brake pipe BP, while concurrently venting the brake cylinder device BC disposed on the car. Such operation is well-known to those skilled in the railway braking art, being known as "release and charging", and thus requires no further explanation.

Figure 3:
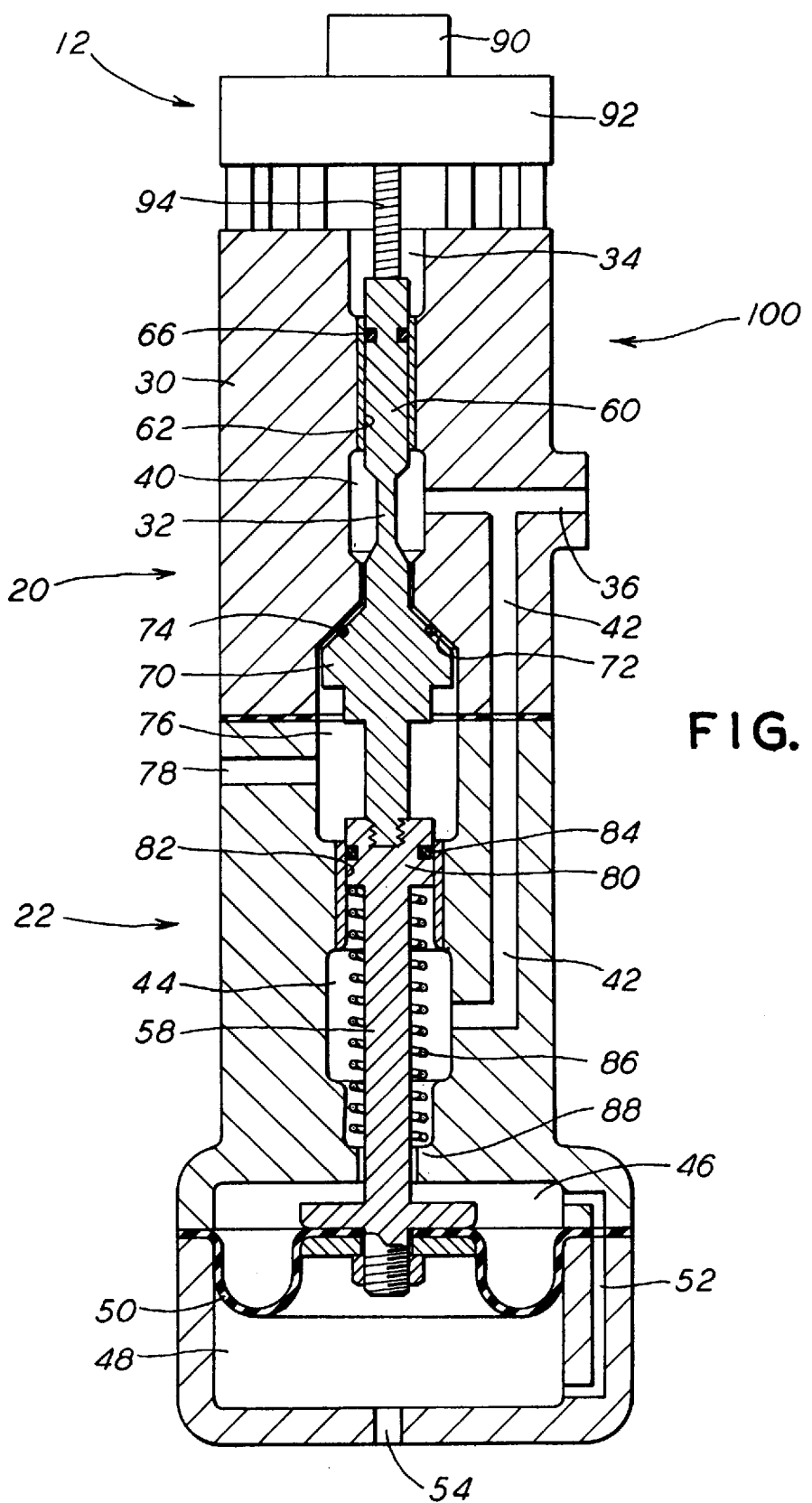
FIG. 3 is a diagrammatic, cross-sectional view showing a presently preferred embodiment of the motor-pneumatic controlled valve device of this invention for carrying out the service and emergency reduction of brake pipe pressure in accordance with the indirect cylinder pressure control system of FIG. 2.

In accordance with the embodiment illustrated in FIG. 3, the valve device 100, in the presently preferred embodiment of this invention, comprises a valve housing 30 with an elongated valve body 32 reciprocatingly disposed within an elongated bore 34 centrally disposed within valve housing 30. A primary air supply passage 36, disposed in an upper portion of the elongated bore 34, extends into a receiving chamber 40. Such primary air supply passage 36 is connected to the brake pipe BP via branch pipe 38. Accordingly, receiving chamber 40 is normally charged with compressed air at brake pipe pressure.

A branch supply passage 42 extends from the primary air supply passage 36 to similarly maintain chambers 44 and 46 charged with compressed air at the brake pipe pressure. As is clearly illustrated, the chamber 46 is separated from the chamber 48 by a diaphragm 50, while a small bypass passageway 52 (about 1/16 inch diameter) is provided to generally equalize the air pressure within the two chambers 46 and 48.

A significantly larger emergency exhaust passageway 54 extends from chamber 48 with a solenoid-operated, spring returned, exhaust valve 56 connected to the exit end thereof. In normal operation, i.e., in the absence of an emergency brake application, such emergency exhaust valve 56 is in a closed position, as is necessary to maintain the brake pipe pressure within each of the respective chambers 44, 46 and 48.

As is further shown, the diaphragm 50 is attached to a valve stem 58, which extends from the elongated valve body 32, such that collapse of diaphragm 50 into the chamber 48 will cause such valve stem 58, and accordingly the entire valve body 32 to be pulled in a downward direction as viewed in FIG. 3.

With further regard to elongated valve body 32, a cylindrical upper end portion 60 thereof is slidably disposed within a cylindrical sleeve 62 which forms a part of the bore 34. In this manner, such cylindrical upper end portion 60 of the valve body 32 is adapted for reciprocating motion within such cylindrical sleeve 62. A receiving chamber 40, also forming a part of the bore 34, is provided below the cylindrical sleeve 62. The receiving chamber 40 serves as a terminus portion of the primary air supply passage 36. An O-ring seal 66 is, preferably, provided on the cylindrical upper end portion 60 to prevent escape of brake pipe pressure from the receiving chamber 40.

A conical shaped valve 20 is provided below such receiving chamber 40 which is intended to exhaust brake pipe pressure from the receiving chamber 40 for purposes of making a service brake application. As can be clearly seen in the drawing, such conical shaped valve 20 comprises a male conical valve head portion 70 circumferentially disposed on the elongated valve body 32 and is adapted to seat within a female conical valve seat 72 which also forms a part of the bore 34.

There is an O-ring seal 74 provided on such conical valve head portion 70 to prevent escape of such brake pipe pressure from the receiving chamber 40 when valve 20 is intended to be closed. An exit chamber 76 is provided below the valve 20 into which conical valve head portion 70 recedes when the valve 20 is opened. Such exit chamber 76 is in communication with an exhaust passage 78. Accordingly, when such conical valve 20 is even partially opened, air pressure within the receiving chamber 40 will pass into such exit chamber 76 and further pass from the valve device 100 via the exhaust passage 78.

A reciprocatible piston-like element 80, forming a part of such elongated valve body 32, is provided below the exhaust passage 78. Such piston-like element 80 is adapted for reciprocating motion within a cylindrical portion 82 which forms a part of the bore 34. Here again, an O-ring seal 84 is, preferably, provided on such piston-like element 80 to prevent escape of brake pipe pressure from such emergency exhaust chamber 44 which is disposed below the cylindrical portion 82.

A compression spring 86 is compressively disposed between the underside of such piston-like element 80 and a flange 88 located at the base of such bore 34. Such compression spring 86 is further disposed to encircle valve stem 58 and serves to bias such valve body 32 in an upwardly direction as viewed in the drawing.

The combination of such piston-like element 80, the cylindrical portion 82 and the emergency exhaust chamber 44 serve to form a second valve, namely, the emergency exhaust valve 22, which is opened when piston-like element 80 moves downwardly sufficient to clear the lower edge of cylindrical portion 82 to expose such exhaust chamber 44 to the exhaust passage 78.

A motor drive means 12, containing a small electric motor 90, a gear drive assembly 92 and a gear driven element 94 is provided on the top portion of the valve housing 30. Activation of such electric motor 90 will, through gear drive assembly 92, cause the gear driven element 94 to be driven downward against the top of the cylindrical member 60, which forms a part of such elongated valve body 32. Accordingly, proper activation of such electric motor 90 in one direction will cause such valve body 32 to move in a downwardly direction, while activation of the electric motor 90 in the other direction will permit the valve body 32 to be returned in an upwardly direction by virtue of such compression spring 86.

Pursuant to a normal operation, the brake pipe BP will be charged to the train operating pressure by movement of the locomotive brake valve handle (not shown) to a release position in a manner which is well known in the railroad industry. The branch pipe 10 conducts compressed air from such brake pipe BP to each control device CV on each car $C_N$ thereby charging each auxiliary reservoir AR and each emergency reservoir ER and exhausting any compressed air in each brake cylinder BC.

Concurrently with the charging of the brake pipe BP, there is a corresponding radio signal transmitted to the EOT disposed on the last car $C_{NL}$. Microprocessor MPU operates in response to this radio signal to move the electric motor 90 to its valve closing position and to close the emergency solenoid valve 56. With electric motor 90 returned to its valve closing position, the compression spring 86 will then force the valve body 32 upward thereby closing the valves 20 and 22.

When it is desired to make a service brake application, following charging of the brake pipe, the locomotive brake valve (not shown) is set in a position to achieve a reduction of the brake pipe air pressure. The degree of such brake pipe air pressure reduction corresponds to the degree of service brake application desired. This reduction of such brake pipe air pressure constitutes a pneumatic signal that is propagated through the train consist from front to rear via the brake pipe BP. Concurrently, according to a presently preferred embodiment of this invention, a service brake command signal is transmitted via radio from the locomotive to the end-of-train unit EOT which corresponds to the reduced locomotive brake pipe air pressure.

Microprocessor unit MPU operates in response to this radio signal to energize the electric motor 90 via a corresponding drive signal. Through the drive signal, the microprocessor unit MPU drives electric motor 90 to the extent necessary to open the valve 20 and thereby reduce the brake pipe air pressure to the target pressure, namely, the reduced locomotive brake pipe air pressure. When this target brake pipe air pressure is achieved, the microprocessor unit MPU then causes the electric motor 90 to be activated in the reverse rotation, thereby withdrawing the gear driven element 92 from the end of the valve body 32 which will permit the compression spring 86 to at least partially close the valve 20 and thereby maintain the target brake pipe air pressure within such brake pipe BP.

It should be apparent that the motor driven control will essentially permit rather fine, micro adjustment of the valve 20. In the presently preferred embodiment of the invention, such microprocessor unit MPU should be programmed to, in essence, instantly commence opening of such valve 20 on demand and at a relatively high RPM of electric motor 90. However, as the air pressure within the brake pipe approaches the target pressure, the speed of the electric motor 90 can be reduced in order to exactingly control the desired end point.

Likewise, when an emergency brake application is desired, the microprocessor unit MPU receives the appropriate radio signal from the locomotive and, in this case, the microprocessor unit MPU will energize the solenoid operated exhaust valve 56 via a corresponding actuating signal. When the solenoid valve 56 receives this signal, solenoid valve 56 energizes thereby quickly opening the valve 22. The compressed air within chamber 48 exhausts via the emergency exhaust passageway 54. With the compressed air in chamber 48 fully and quickly exhausted, the pressure differential on opposite sides of diaphragm 50 will cause the diaphragm 50 to collapse downward into chamber 48. This not only opens emergency valve 22, but also fully opens valve 20.

Specifically, by moving the valve body 32 downward to the maximum extent, such piston-like element 80 is caused to move below the cylindrical portion 82. This permits the pressurized air present in chamber 44 to be quickly exhausted via exit chamber 76 and exit passage 78. At the same time, of course, the valve 20 is opened to its maximum extent.

While it may be observed that the chambers 46 and 48 are interconnected by the bypass passageway 52, it was noted above that such bypass passageway 52 should be rather small (approximately 1/16 inch diameter or less). The reason for the small diameter passageway 52 is that when such chamber 48 is exhausted for purposes of an emergency brake application, the air pressure in chamber 46 should not also be exhausted therewith, but rather this air pressure must be at least momentarily maintained for purposes of opening the valve 22, as described above.

Nevertheless, the air pressure within such chamber 46 will in time be exhausted concurrently with exhaustion of the air pressure within chamber 44, so that the air pressure existing on either side of such diaphragm 50 will be rather quickly equalized, thereby permitting the compression spring 86 to return the valve body 32 to its uppermost position, thereby effectively closing both of the valves 20 and 22. At this point in time, however, essentially all of the brake pipe air pressure will be exhausted and the emergency brake application continued until the brake pipe air pressure is recharged, as above described.

As should be apparent from the above detailed description, a number of modifications and other embodiments could be incorporated without departing from the spirit of the invention. For example, a number of differing pneumatic emergency valve controls could be devised. Therefore, while the detailed description presented above represents the presently preferred embodiment of the valve and valve control arrangement, it should be apparent that a great number of changes could be incorporated and varied embodiments could be devised by those persons who are particularly skilled in the railway braking art without departing from the scope of the appended claims.

I claim:

1. A valve device for reducing air pressure in a brake pipe located on a railroad car disposed in a train at a location in such train remote from a train locomotive, said valve device comprising:

a. a valve means disposed within said valve device adapted to vent brake pipe air pressure from said brake pipe when said valve means is at least partially open, a rate of discharge of such brake pipe air pressure being in proportion to an extent said valve means is open;
   b. a motor drive means connected to said valve means for at least partially opening said valve means to effect a controlled brake pipe air pressure reduction; and
   c. a pneumatic drive means connected to said valve means for fully opening said valve means to effect an emergency brake pipe air pressure reduction.

2. The valve device, according to claim 1, wherein said motor drive means is responsive to a drive signal through which to initiate a service brake pipe air pressure reduction.

3. The valve device, according to claim 2, wherein said pneumatic drive means is responsive to an actuating signal through which to initiate an emergency brake pipe air pressure reduction.

4. The valve device, according to claim 1, wherein said motor drive means includes an electric motor and a gear driven element actuated by said electric motor, said gear driven element disposed to engage said valve means such that said valve means can be opened in proportion to an extent to which said gear driven element is moved by said electric motor.

5. The valve device, according to claim 1, wherein said pneumatic drive means includes a solenoid operated and spring returned exhaust valve adapted to quickly vent such brake pipe air pressure from said valve device.

6. The valve device, according to claim 5, wherein said pneumatic drive means further includes a diaphragm operated piston-like member adapted to open and close said valve means and said solenoid operated exhaust valve is adapted to vent such brake pipe air pressure from a chamber disposed adjacent said diaphragm operated piston-like member to thereby activate said diaphragm operated piston-like member to fully open said valve means.

7. The valve device, according to claim 1, wherein said valve means includes two distinct valves each of which being responsive to both said motor drive means and said pneumatic drive means with said motor drive means being primarily adapted to at least partially open a first of said two distinct valves to effect said controlled brake pipe air pressure reduction and said pneumatic drive means being primarily adapted to fully open a second of said two distinct valves to effect said emergency brake pipe air pressure reduction.

8. A valve device for reducing air pressure in a brake pipe located on a railroad car disposed in a train at a location in such train remote from a train locomotive, said valve device comprising:

a. a housing member;
   b. a primary supply passage formed in said housing member and adapted to be connected to such brake pipe;
   c. an exhaust passage formed in said housing member and adapted to be opened to atmosphere;
   d. a longitudinal bore formed in said housing member, said longitudinal bore in communication with said primary supply passage and said exhaust passage;
   e. a valve means disposed within said longitudinal bore for moving reciprocatingly between a closed position and a fully open position to selectively close, open and partially open said primary supply passage to said exhaust passage;
   f. an electric motor drive means connected to said housing member for partially opening said valve means and thereby partially open said primary supply passage to said exhaust passage; and g. a pneumatic drive means connected to said valve means for fully opening said valve means and thereby fully open said primary supply passage to said exhaust passage.

9. The valve device, according to claim 8, wherein said electric motor drive means is responsive to a drive signal through which to initiate a service brake pipe air pressure reduction and said pneumatic drive means is responsive to an actuating signal through which to initiate an emergency brake pipe air pressure reduction.

10. The valve device, according to claim 8, wherein said valve device defines within said housing member a branch supply passage in communication with such brake pipe and said longitudinal bore, said valve means includes a pair of valves each of which being responsive to both said electric motor drive means and said pneumatic drive means with a first of said pair of valves being primarily used to variably open said primary supply passage to said exhaust passage and a second of said pair of valves being primarily used to fully open said branch supply passage to said exhaust passage.

11. The valve device, according to claim 10, wherein said first valve includes a male conical shaped valve head portion on said valve means which is engageable with a female conical shaped valve seat portion forming a first wall of said longitudinal bore.

12. The valve device, according to claim 10, wherein said second valve includes a male cylindrical valve body portion reciprocatingly disposed within a female cylindrical portion forming a second wall of said longitudinal bore.

13. The valve device, according to claim 8, wherein said pneumatic drive means includes a diaphragm operated piston member adapted to open and close said second valve and a solenoid operated exhaust valve adapted to quickly vent brake pipe air pressure from a chamber disposed adjacent said diaphragm operated piston member to thereby activate said diaphragm operated piston member to fully open said second valve.

14. The valve device, according to claim 8, wherein said valve device further includes a compression spring adapted to bias said valve means to a closed position when neither said electric motor drive means nor said pneumatic drive means are activated to open said valve means.

15. A valve device for reducing air pressure in a brake pipe located on a railroad car disposed in a train at a location in such train remote from a train locomotive, said valve device comprising:

a. a housing member;

b. an elongated valve body member disposed for reciprocating movement within an elongated bore formed in said housing member;

c. a first air supply passage formed in said housing member and to which said brake pipe is connected in fluid communication with a first end of said elongated bore;

d. a second air supply passage formed in said housing member and to which said brake pipe is connected in fluid communication with a second end of said elongated bore;

e. an air exhaust passage formed in said housing member which is open to atmosphere and in fluid communication with said elongated bore between said first air supply passage and second air supply passage;

f. a compression spring disposed within said elongated bore and adapted to bias said elongated valve body to a closed position;

g. a first valve incorporated with said valve body between said first air supply passage and said air exhaust passage;

h. a second valve incorporated with said valve body between said second air supply passage and said air exhaust passage;

i. a motor drive means adapted for micro movement of said valve body sufficient to adjustably open said first valve to thereby adjustably open said first air supply passage to said air exhaust passage but insufficient to open said second valve; and j. a pneumatic drive means adapted for macro movement of said valve body sufficient to fully open said second valve to thereby fully open said second air supply passage to said air exhaust passage.

16. The valve device, according to claim 15, wherein said motor drive means is operable in response to a drive signal through which to achieve a service brake pipe air pressure reduction and said pneumatic drive means is operable in responsive to an actuating signal through which to achieve an emergency brake pipe air pressure reduction.

17. The valve device, according to claim 15, wherein said adjustable valve includes a male conical shaped valve head disposed on said elongated valve body that is engageable with a female conical shaped valve seat forming a first wall of said elongated bore.

18. The valve device, according to claim 15, wherein said second valve includes a male cylindrical valve on said elongated valve body that is reciprocatingly disposed within a female cylindrical portion forming a second wall of said elongated bore.

19. The valve device, according to claim 15, wherein said motor drive means includes an electric motor and a gear driven element, said gear driven element engaging said valve body such that activation of said electric motor causes micro movement of said gear driven element thereby causing micro movement of said valve body sufficient to adjustably open said adjustable valve.

20. The valve device, according to claim 15, wherein said pneumatic drive means includes a diaphragm operated piston member adapted to open and close said second valve and a solenoid operated exhaust valve adapted to quickly vent brake pipe air pressure from a chamber adjacent to said diaphragm operated piston member to thereby activate said diaphragm operated piston member to cause macro movement of said valve body and fully open said second valve.

* * * * *